(12) United States Patent
Dugan et al.

(10) Patent No.: US 8,341,690 B2
(45) Date of Patent: *Dec. 25, 2012

(54) AUTOMATIC RECONFIGURATION DEVICE

(75) Inventors: Michael T. Dugan, Parker, CO (US);
Thomas S. Taylor, Atlanta, GA (US);
Henry Gregg Martch, Parker, CO (US);
David A. Kummer, Highlands Ranch,
CO (US); Mark H. Gomez, Parker, CO
(US); Anthony G. Dower, III, Parker,
CO (US)

(73) Assignee: EchoStar Corporation, Englewood, CO
(US)

( * ) Notice: Subject to any disclaimer, the term of this
patent is extended or adjusted under 35
U.S.C. 154(b) by 0 days.

This patent is subject to a terminal disclaimer.

(21) Appl. No.: 12/891,804

(22) Filed: Sep. 28, 2010

(65) Prior Publication Data

US 2011/0040856 A1 Feb. 17, 2011

Related U.S. Application Data

(63) Continuation of application No. 11/117,819, filed on Apr. 28, 2005, now Pat. No. 7,805,751.

(60) Provisional application No. 60/566,324, filed on Apr. 28, 2004.

(51) Int. Cl.
*H04N 7/16* (2006.01)
(52) U.S. Cl. ........... 725/153; 725/151; 725/37; 348/178
(58) Field of Classification Search .................. 725/133, 725/139–141, 151, 153
See application file for complete search history.

(56) References Cited

U.S. PATENT DOCUMENTS

| 4,903,307 | A | * | 2/1990 | Ozawa et al. ............... 381/103 |
| 5,550,644 | A | | 8/1996 | So |
| 5,659,883 | A | | 8/1997 | Walker et al. |
| 5,886,847 | A | | 3/1999 | Lee et al. |
| 6,133,910 | A | | 10/2000 | Stinebruner |
| 6,628,344 | B1 | | 9/2003 | Weber |
| 7,805,751 | B1 | | 9/2010 | Dugan et al. |
| 2002/0057336 | A1 | | 5/2002 | Gaul et al. |
| 2002/0174270 | A1 | | 11/2002 | Stecyk et al. |
| 2004/0128402 | A1 | * | 7/2004 | Weaver et al. .................... 710/1 |

(Continued)

FOREIGN PATENT DOCUMENTS

WO WO 2006/042318 4/2006

OTHER PUBLICATIONS

International Search Report and Written Opinion dated Dec. 7, 2009, PCT/US2009/066998, 15 pages.

(Continued)

*Primary Examiner* — Pankaj Kumar
*Assistant Examiner* — Timothy Newlin
(74) *Attorney, Agent, or Firm* — Seed IP Law Group PLLC (57) ABSTRACT

The present invention provides a method and device that can easily configure an entertainment system automatically or semi-automatically. The reconfiguration of the entertainment system can be achieved by cycling through the possible configurations of the entertainment system (i.e. different combinations of operational states of the components that make up the entertainment system) by changing various operational states of certain components until an operable configuration is found. The invention may be implemented in any component of the entertainment system including a set-top-box, satellite receiver or a remote control.

34 Claims, 8 Drawing Sheets

U.S. PATENT DOCUMENTS

| | | |
|---|---|---|
| 2007/0195195 A1 | 8/2007 | Hicks |
| 2008/0225184 A1 | 9/2008 | Hardacker et al. |
| 2009/0300620 A1 | 12/2009 | Park et al. |
| 2010/0146579 A1 | 6/2010 | Reams et al. |

OTHER PUBLICATIONS

Office Action dated Sep. 19, 2011, U.S. Appl. No. 12/330,368, 15 pages.
Office Action dated May 28, 2008, U.S. Appl. No. 11/117,819, 27 pages.
Amendment and Response to Office Action dated Septemer 26, 2008, U.S. Appl. No. 11/117,819, 18 pages.
Final Office Action dated Jan. 9, 2009, U.S. Appl. No. 11/117,819, 32 pages.
Request for Continued Examination and Amendment and Response to Final Office Action dated Apr. 3, 2009, 12 pages.
Office Action dated Jun. 8, 2009, U.S. Appl. No. 11/117,819, 17 pages.
Amendment and Response to Office Action dated Sep. 3, 2009, 12 pages.
Final Office Action dated Dec. 22, 2009, U.S. Appl. No. 11/117,819, 16 pages.
Notice of Appeal and Amendment After Final dated Feb. 19, 2010, 13 pages.
Appeal Brief dated Apr. 19, 2010, U.S. Appl. No. 11/117,819, 21 pages.
Notice of Allowance and Fee(s) Due dated Jul. 16, 2010, 4 pages.
Response to Office Action dated Dec. 6, 2011, U.S. Appl. No. 12/330,368, 4 pages.
Final Office Action dated Feb. 15, 2012, U.S. Appl. No. 12/330,368, 15 pages.

\* cited by examiner

AUTOMATIC RECONFIGURATION DEVICE

RELATED APPLICATIONS

This application is a continuation of U.S. patent application Ser. No. 11/117,819, titled "AUTOMATIC RECONFIGURATION DEVICE", filed Apr. 28, 2005, which claims priority to U.S. Provisional Application Ser. No. 60/566,324, titled "AUTOMATIC RECONFIGURATION DEVICE" filed Apr. 28, 2004. Both of the abovementioned applications are hereby incorporated herein by reference in their entirety.

FIELD OF THE INVENTION

The present invention generally relates to an apparatus and method of operating a entertainment system. More particularly, the invention relates to an apparatus and method of automatically reconfiguring an entertainment system, including, for example, a television and any attached components such as a VCR, in the event that the original configuration of the entertainment system is changed.

BACKGROUND OF THE INVENTION

A modern entertainment system typically contains a number of components. Such components may include, but are not limited to, a video cassette recorder (VCR), a digital video disc (DVD) player, digital video recording (DVR) devices, cable and satellite set-top-boxes, home theater systems and one or more televisions (TVs). As a result of an increasing number of components, the operation of entertainment systems has become more complex. Typically, each component will have a number of different 'operational states' relating to where signals are received and transmitted by the component.

For example, each channel that a TV can be tuned to can be regarded as a separate operational state. In addition, modern TVs have other operational states including dedicated composite video inputs and other auxiliary inputs that the TV can be set to monitor. VCRs are another example of components that also have numerous operational states. VCRs have operational states relating to both the output of signals and the input of signals. A typical VCR can be set to transmit signals to a TV on channel 3 or 4. VCRs can also be set to record and monitor signals on different channels. Similarly, other entertainment system components typically possess a multitude of operational states.

A drawback of the increasing proliferation of components with multiple operational states in entertainment systems is that setting and maintaining the operational states of components in an operable combination has become increasingly difficult and complicated task, a task that can be referred to as configuring the entertainment system. In many entertainment systems, changing the operational state of even one component may, in certain circumstances, render the entertainment system non-functional.

This environment makes it very easy for a user to inadvertently change the operational state of one component and thereby reconfigure the entertainment system to an inoperable configuration. In these situations the user often does not know what the user did or how to return the entertainment system to the original, operable configuration. For example, in a typical VCR and TV combination, many users do not realize that the TV must be set to a designated operational state (usually channel 3 or 4) to receive the signal from the VCR. In that case, if the user accidentally or unknowingly changes the channel on the TV, the user may not be able to determine why she can no longer view signals from the VCR and consequently, since the content source is often routed through the VCR, may not be able to view any content at all.

The proliferation of components, component functions and operational states, and component complexity in use today have multiplied the ways in which a modern entertainment system may be rendered useless via an inadvertent change in the configuration of one or more components. It also makes it harder for the average user to determine what change was made and how to correct it. Thus, there is a need for entertainment systems to be able to reconfigure themselves, or at least assist users reconfigure the systems, to return it to proper operation.

Many inadvertent or unknowing changes in configuration are interpreted by the unsophisticated user as a hardware failure or some other failure on the part of their content distributor, such as a cable or satellite television distributor. Often the user is unaware that it was an action by the user that reconfigured the system. In addition, most owners of entertainment system components do not have an ongoing relationship with the component manufacturers. These owners, however, typically have an ongoing relationship with their content distribution company.

In these situations the typical user response is to call their content distributor. Calls due to configuration changes can represent a very significant portion of the calls received. If the number of these calls can be reduced, it would result in cost benefits for the content distributor. Thus, there is also a need on the part of the content distributors to reduce the number and the duration of calls to their technical assistance departments resulting from the inadvertent reconfiguration of an entertainment system.

SUMMARY OF THE INVENTION

The present invention addresses these and other problems associated with the prior art in providing a method and device that can automatically or semi-automatically configure an entertainment system. The reconfiguration of the entertainment system can be achieved by stepping through the possible configurations of the entertainment system (i.e. different combinations of operational states of the components that make up the entertainment system) by changing various operational states of certain components until an operable configuration is found.

DETAILED DESCRIPTION OF THE PREFERRED EMBODIMENTS

In this specification, the present invention will be described using methods and systems related to an entertainment system that includes subscriber satellite television components. This specific description is not meant to limit the invention to that one embodiment. One skilled in the art will recognize that the present invention can apply elsewhere. While the invention has been particularly shown and described with reference to preferred embodiments thereof, it will be understood by those skilled in the art that various other changes in the form and details may be made therein without departing from the spirit and scope of the invention.

As a general matter, the disclosure uses the term "automatic reconfiguration device (ARD)" to refer to one or more devices or components that can change the operational states of one or more components in an entertainment system. The disclosure also uses the term "component" to refer to any electronic device that independently, or together with other electronic devices, delivers content to a user or users of an entertainment system. Examples of components include, but are not limited to, devices such as stereos, TVs, VCRs, DVD players, DVR devices, set-top-boxes, and home theater receivers.

As another general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "content management device," "television converter," "receiver," "set-top-box," "set top box," "television receiving device," "television receiver," "television recording device," "satellite set-top-box," "satellite receiver," "cable set-top-box," "cable receiver," and "television tuner" to refer interchangeably to a converter device or electronic equipment that may include, but is not limited to, the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a content management device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated content management device (e.g., an internal cable-ready television tuner housed inside a television) or, alternatively, that is connected to an external content management device (e.g., an external set-top-box connected via cabling to a television). A further example of an external content management device is the EchoStar Dish PVR 721, Part Number 106525, combination satellite set-top-box and DVR.

As a further general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this disclosure, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may occupy. The term "content," as used in this disclosure, refers to anything delivered to a user, whether as audio, video, audiovisual (A/V), or data. Content can be video, audio, combined A/V, pictorial, textual or purely electronic in nature. Examples of content include, but are not limited to, distinct TV programs, streaming video, streaming audio, interactive audio, interactive video, distinct musical works, distinct pictorial or graphic works, .htm or .html documents when viewed with a browser, and motion pictures or other A/V works.

Finally, this disclosure uses the term "entertainment system configuration" to describe a specific combination of operational states of the components of an entertainment system. For example, in an entertainment system comprising a TV and a VCR, one configuration of the entertainment system is the TV set to channel 3 and a VCR set to output signals on channel 3. This is an example of an operable configuration. Likewise, an "operational state" is a term used to describe a condition of a component. Components may have multiple operational states. Examples of components with a plurality of operational states are TVs with selectable channels or display properties, VCRs with certain output channels (i.e. 3 or 4), and satellite set-top-boxes with selectable outputs.

The present invention is directed towards an ARD and method for reconfiguring at entertainment system. This can be done, for example, by stepping through the various operational states of the components of the entertainment system until an operable configuration (i.e. operable combination of operational states of the components) is determined. One embodiment of the present invention is a utility available to the entertainment system user for reconfiguring the entertainment system. It is contemplated that users will use this utility, in situations where the configuration has been inadvertently changed to a non-operable configuration, to quickly reconfigure the entertainment system. It is further contemplated that the utility would be useful to technicians installing and servicing the entertainment system.

Figure 1:
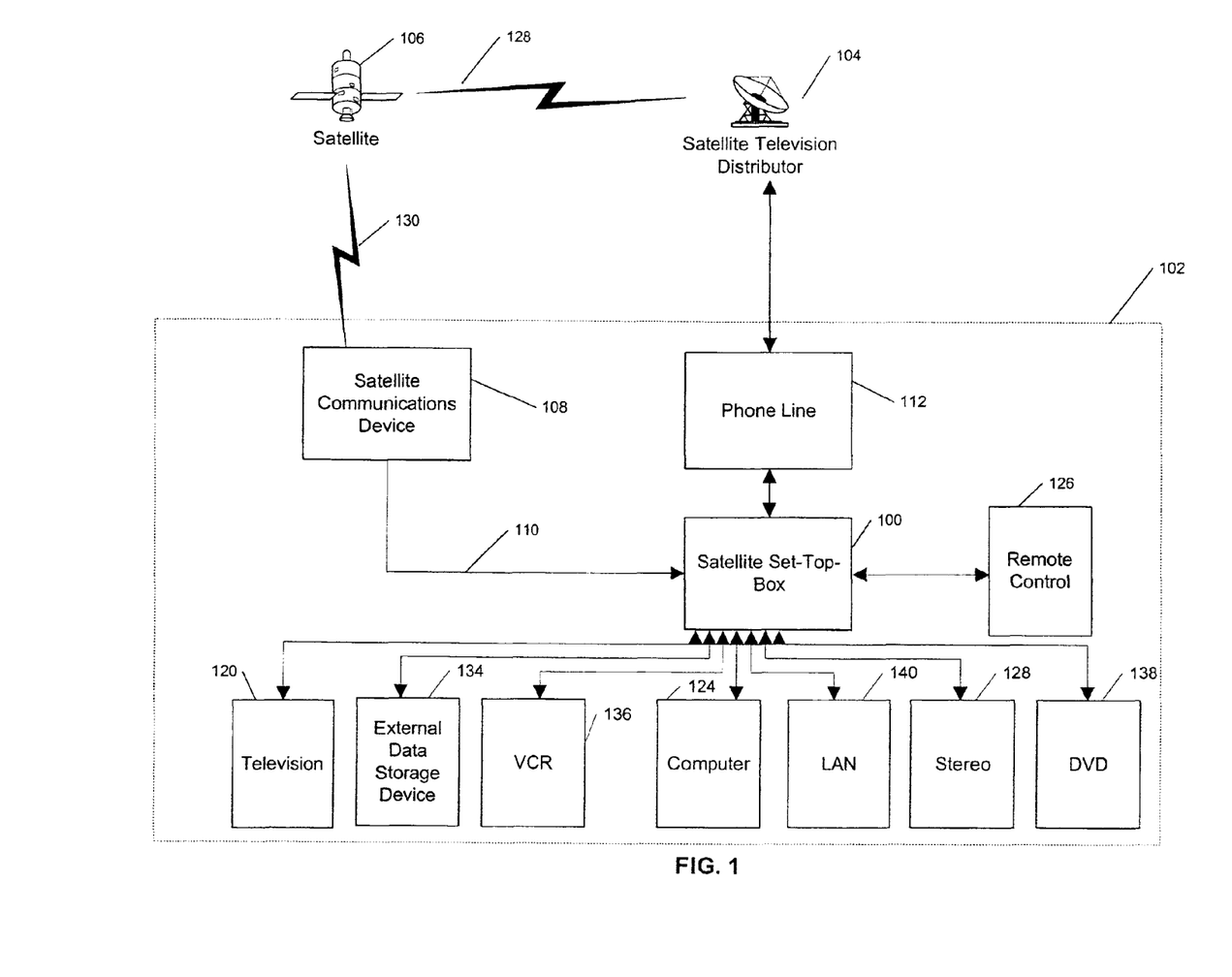
FIG. 1 illustrates an entertainment system in accordance with an embodiment of the present invention.

Turning now to the Drawings, wherein like numbers denote like parts throughout the several views, FIG. 1 illustrates an entertainment system 102, in accordance with an embodiment of the present invention, that includes a content management device (CMD) 100 in the form of a satellite set-top-box. Generally, the satellite set-top-box 100 may receive one or more television signals from a cable television distributor, from a broadcast television distributor or from a satellite television distributor 104. As a preferred embodiment, entertainment system 102 receives signals from a satellite television distributor 104. One skilled in the art will recognize that alternative embodiments of entertainment system 102 may exclude the connection to a television or television distributor, such as a cable, satellite, or broadcast television distributor. One skilled in the art will recognize that set-top-box 100 may also receive video digital subscriber line (VDSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below. One skilled in the art will recognize that many embodiments of the entertainment system 102 are possible and within the scope of this invention. Other such embodiments may include, but are not limited to, various combinations or permutations of devices and connections for the delivery, storage, and display of communications, content and other data.

To further describe a preferred embodiment of entertainment system 102, a satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz. Other embodiments of the entertainment system are possible. For example, in one embodiment, the CMD 100 can only receive and distribute signals from a wired content provider 116.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible. The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the content management device 100 via cabling. One skilled in the art will recognize that other methods and other systems of delivering the satellite signal 110 to the satellite set-top-box 100 may be possible.

It will be understood to one skilled in the art that while FIG. 1 shows the components connected serially, the disclosure also contemplates entertainment systems 102 where the components are connected as a network (i.e. each component is connected to all the others), in parallel, or some combination of serial, parallel and network connections. While FIG. 1 illustrates an entertainment system 102 with a multitude of components, for the purposes of this application the entertainment system 102 need only comprise a minimum of one component and an ARD.

As illustrated in FIG. 1, one embodiment of entertainment system 102 includes a CMD 100 that is connected to one or more components. Examples of typical entertainment system 102 components include a TV 120, a high definition television (HDTV) set (not shown), a computer 124, and a stereo 128. It should be noted that by stereo 128, this application refers to any type of primarily audio delivery system and includes devices as simple as a speaker or headphones connected to the CMD 100 and devices as complex as digital surround sound home theater systems and whole-house audio systems.

The CMD 100 of the preferred embodiment may also be connected to several peripheral components. Examples of peripheral components include, but are not limited to, devices such as a telephone (not shown), content capture devices such as a video camera 132 or microphone (not shown), external data storage and playback devices 134, a VCR 136, a DVD player 138, and multipurpose components for a local area network (LAN) 140 that may permit interconnection between components. Another common peripheral component of the entertainment system 102 is one or more remote controllers 126. While some peripheral components are typically, but not necessarily, connected to the CMD 100 or other components by wire, remote controllers are typically connected to the CMD 100 by an RF, IR or some other non-physical connection. For example, the EchoStar Technologies Corporation remote control, Model No. 123479171-AA has a pair of transmitters, an IR transmitter and an ultra high frequency (UHF) transmitter, that are used to connect and send commands to a CMD 100.

In the embodiment shown in FIG. 1, the ARD is implemented as part of the CMD 100. One skilled in the art will recognize that the ARD may be implemented in any number of ways and need not be included only as part of the CMD. For example, in other embodiments of the present invention the ARD is alternately implemented as a separate, discrete component of the entertainment system 102, as part of entertainment system 102 peripheral device, such as a remote control 126, or implemented at a remote content distributor's facility, such as that of the satellite television distributor 104. Furthermore, one skilled in the art will recognize that there are many different electronic means for implementing the ARD, regardless of the component, device or location containing the ARD. Such means include software means comprising ARD software that can be executed at need on a processor within a component, firmware means wherein a fixed set of ARD commands to be executed by a processor is embedded with the control circuitry of a component, hardware means wherein the ARD is expressed as fixed circuits that perform the ARD functions when operated, or some combination of software, firmware and hardware means. From this discussion it should be clear that the present invention is directed more towards the functions and methods performed by the ARD than towards any specific means or devices for executing those functions.

Figure 2A:
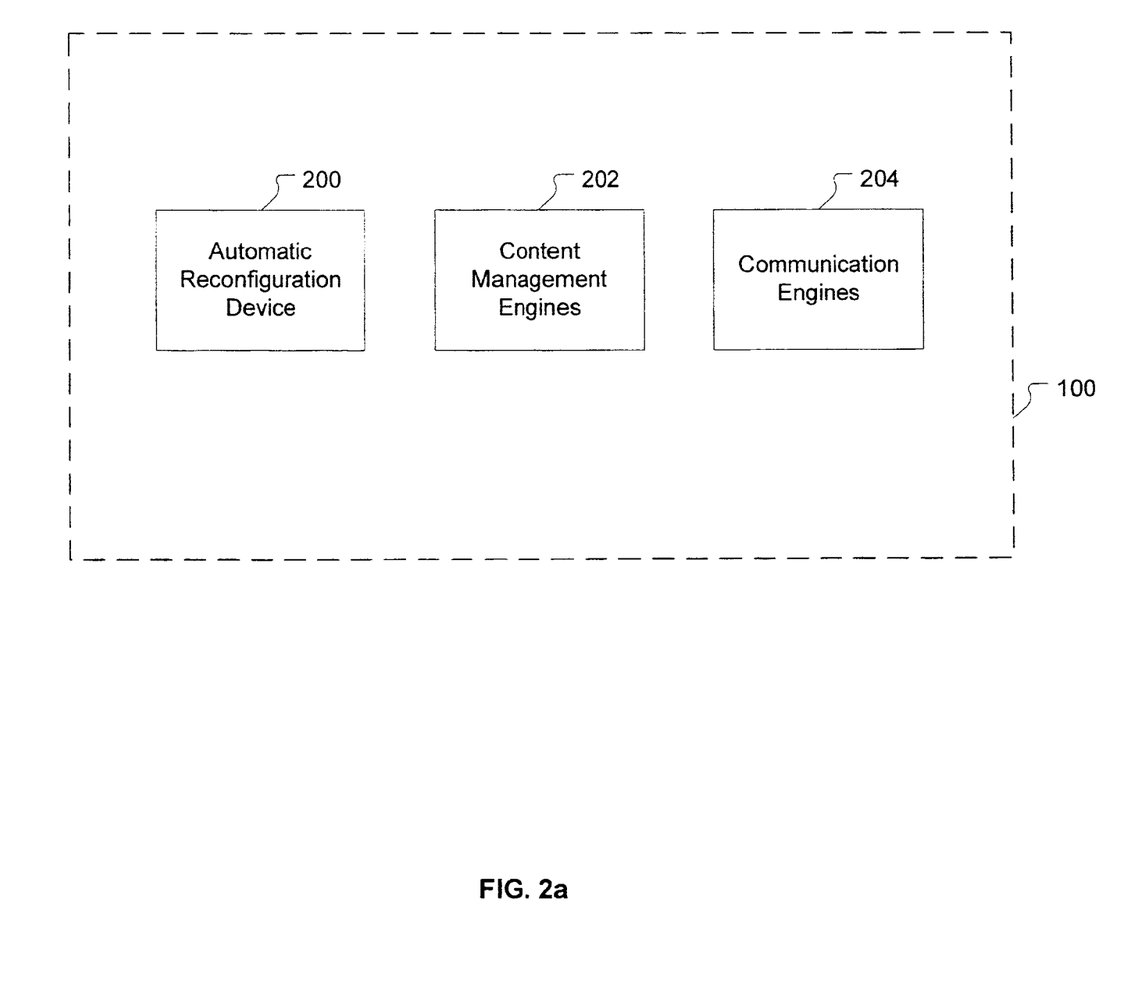
FIG. 2a is a functional block diagram of an Automatic Reconfiguration Device implemented within a Content Management Device in accordance with an embodiment of the present invention.
Figure 2B:
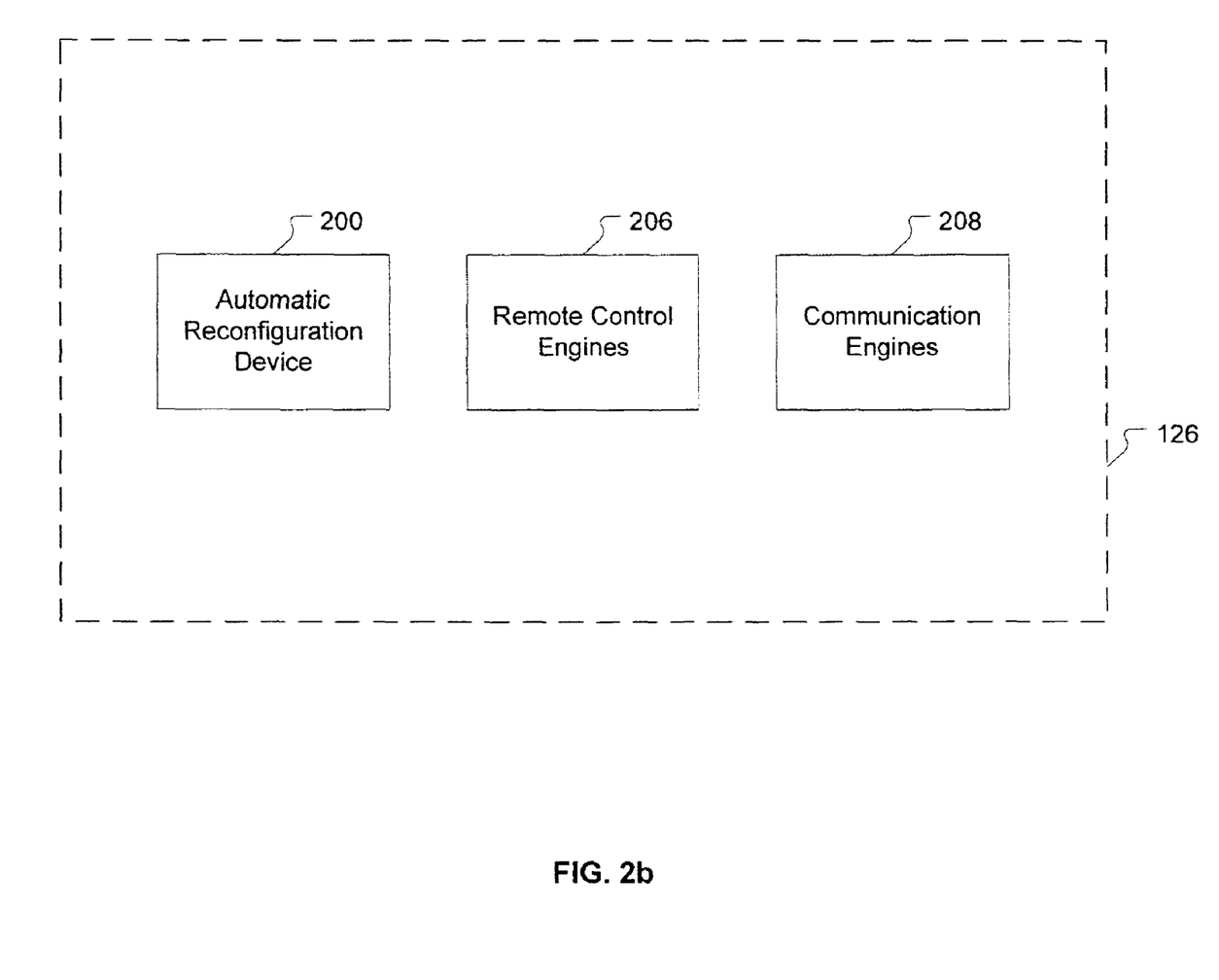
FIG. 2b is a functional block diagram of an Automatic Reconfiguration Device implemented within a remote controller in accordance with an embodiment of the present invention.

FIGS. 2a and 2b illustrate two embodiments of the ARD 200. FIG. 2a illustrates a preferred embodiment of an entertainment system 102 wherein the CMD 100 comprises an ARD 200. FIG. 2b illustrates another preferred embodiment wherein a remote control 126 comprises an internal ARD 200. In another embodiment not specifically shown in the Drawings, it is contemplated that the ARD 200 may be included in any component of the entertainment system 102.

FIG. 2a shows the CMD 100 as comprising three functional elements: the ARD 200; the Content Management Engines 202; and the Communication Engines 204. The Content Management Engines 202 of the CMD 100 may perform all of the content management functions of the CMD 100 that allow it to receive and distribute signals. The Communication Engines 204 represent the hardware and/or software of the CMD 100 that manage the CMD's communications with its connected components.

The ARD 200 of the CMD 100 interfaces with and is capable of changing operational states of the CMD 100 and, potentially, the operational states of the other components of the entertainment system 102 connected to the CMD 100 via the Communications Engines 204. The ARD 200 can issue commands via the Communications Engines 204 that can be interpreted by the connected components to change the components' operational states. A person skilled in the art will recognize that the ARD 200, the Content Management Engines 202, and the Communication Engines 204 may not necessarily correspond to or be identifiable as any distinct device, circuit, software, or part and serve only to describe functions of the CMD 100. One skilled in the art will further recognize that, in other embodiments, the functions of the ARD 200, the Content Management Engines 202, and the Communication Engines 204 may be distributed amongst one or more components within the entertainment system 102.

FIG. 2b illustrates another preferred embodiment wherein a remote control 126 comprises an internal ARD 200. FIG. 2b shows the remote control 126 as comprising three functional elements, the ARD 200, the Remote Control Engines 206 and the remote control's Communication Engines 208. The Remote Control Engines 206 of the remote control 126 perform all of the functions of remote control 126 that allow it to control some or all of the operational states of components connected to the entertainment system 102. The Communication Engines 208 represent the hardware and software within the remote controller 142 that manages the remote controller's communications with connected components of the entertainment system 102.

In a preferred embodiment, the ARD 200 of the remote control 126 communicates with, via the Communications Engines 208, and is capable of changing operational states of the CMD 100 and the other components of the entertainment system 102. The ARD 200 can issue commands via the Communications Engines 204 that can be interpreted by the connected components to change the components' operational states. A person skilled in the art will recognize that the ARD 200, the Remote Controller Engines 206, and the Communication Engines 208 may not necessarily correspond to or be identifiable as any distinct device, circuit, software, or part and serve only to describe functions of the remote control 126.

Figure 3:
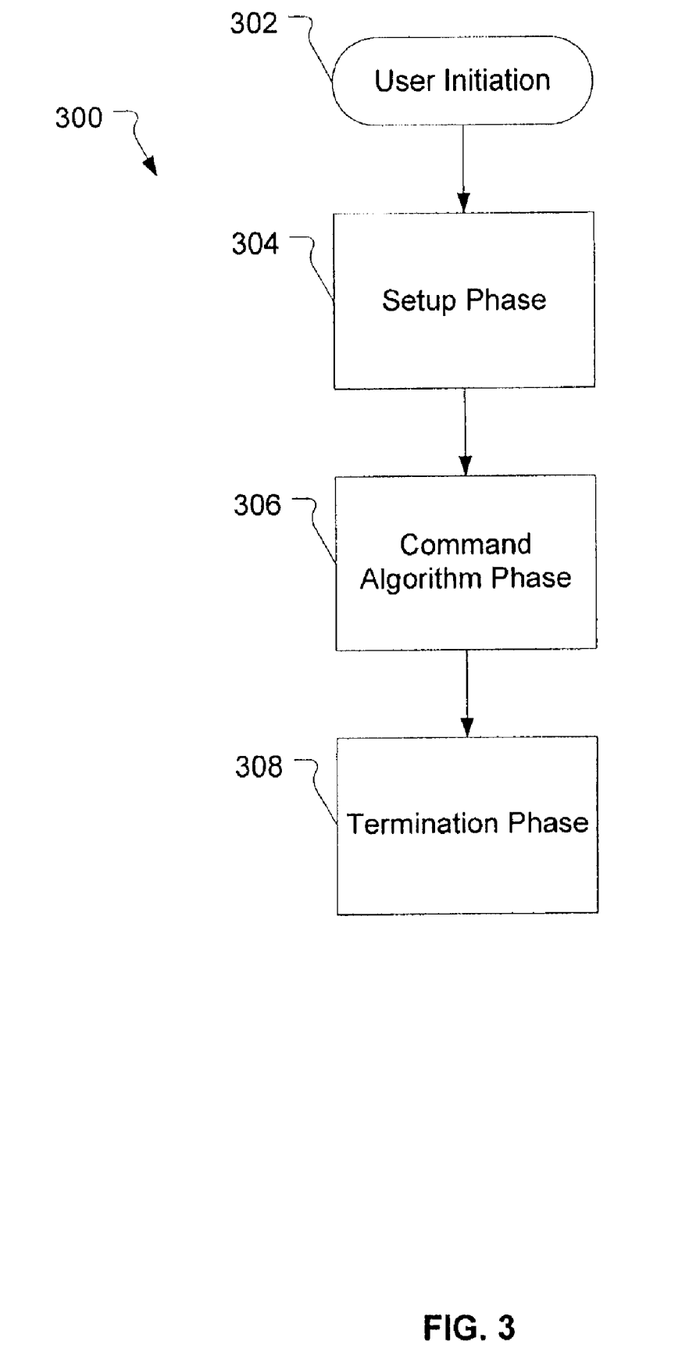
FIG. 3 is a flow chart showing the logical steps performed by an automatic reconfiguration device in accordance with an embodiment of the present invention.

FIG. 3 is an operational flow diagram of one embodiment of a reconfiguration method 300 performed by an ARD 200, whether implemented as a separate, stand-alone component, as part of a CMD 100 as shown in FIG. 2a, as a remote control 126 as shown in FIG. 2b, or as part of another component. The method described by the flow diagram is one embodiment of the method that could be used to implement the functions of the ARD 200.

In this embodiment, the ARD 200 is initiated by a user command, illustrated by the initiation operation 302. This command may be given by the user depressing a button on the CMD 100 or a button on a remote control device connected to the CMD 100, or by the user selecting a reconfiguration command from an on-screen user control menu or by other means readily apparent to those skilled in the art. In a preferred embodiment of the present invention, the user initiates the ARD 200 by pressing and holding down a "Reset" button on the remote control 126 for three seconds.

Upon initiation 302, the ARD 200 goes through a Setup Phase 304 wherein the CMD 100 changes its operational state in preparation of sending commands to connected components. The Setup Phase 304 of the current embodiment is discussed in greater detail in FIG. 4.

If the user does not command the cancellation of the reconfiguration utility in the current embodiment, the ARD 200 will proceed to the Command Algorithm Phase 306 after the Setup Phase 304. During the Command Algorithm Phase 306, the ARD 200 changes the configuration of the entertainment system 102 by stepping through, in response to user commands, the operational states of the connected components. One skilled in the art will recognize that many algorithms for changing the operational states of connected components are possible and within the scope of this invention. During the Command Algorithm Phase 306, the user interactively monitors the condition of the entertainment system 102 until an operable configuration is found. The Command Algorithm Phase 306 is discussed in greater detail in FIG. 5.

When an operable configuration is found the user sets the configuration by commanding the reconfiguration utility to terminate, such a command ends the Command Algorithm Phase 306 and begins the Termination Phase 308. The Termination Phase 308 returns the CMD 100 to normal operation. The Termination Phase 308 is discussed in greater detail in FIG. 6. In a preferred embodiment, the reconfiguration utility will also terminate if the utility 'times out' by not receiving a user command during a predetermined period, e.g. 20 seconds.

In other embodiments of the ARD 200, some or all of the actions performed by the user, as described above, may be performed by the content distributor if the ARD 200 includes a means to allow for such control. For example, in one embodiment the content distributor may perform the initiation operation 302 remotely in response to a user's call to a technical assistance call center. The content distributor may also remotely perform all the tasks ascribed to the user in the other phases of the reconfiguration method 300, including commanding the ARD 200 to step through configurations, monitoring the entertainment system 102, determining when an operable configuration is found, and setting the entertainment system 102 to that configuration by terminating reconfiguration. The embodiments may include the content distributor receiving electronic or user reported (such as via telephone) information concerning the configuration of the entertainment system 102 to assist in determining an operable configuration.

In yet other embodiments of the ARD 200, some or all of the actions ascribed to the user or the content distributor are performed automatically by the ARD 200 and the ARD 200 includes a means to allow for such control. For example, in one embodiment the ARD 200 may periodically initiate a reconfiguration of the entertainment system 102. In addition, the ARD 200 may automatically perform all the tasks required to reconfigure the entertainment system 102. These include automatically stepping through configurations, monitoring the entertainment system 102, determining when an operable configuration is found, and setting the entertainment system 102 to that configuration by terminating reconfiguration. In this embodiment, the ARD 200 may comprise functions for commanding the change of operational states in other components and monitoring the operation of the entertainment system 102.

In some embodiments, the ARD 200 also includes the ability to record the operable configuration of operational states for the connected components of the entertainment system 102. This operable configuration may then be used by the ARD 200 on the next or subsequent initiation of the ARD 200. In a preferred embodiment, after the ARD 200 finds an operable configuration via the reconfiguration method 300, the next time the ARD 200 is initiated the first configuration checked would be that of the previously determined operable configuration.

Figure 4:
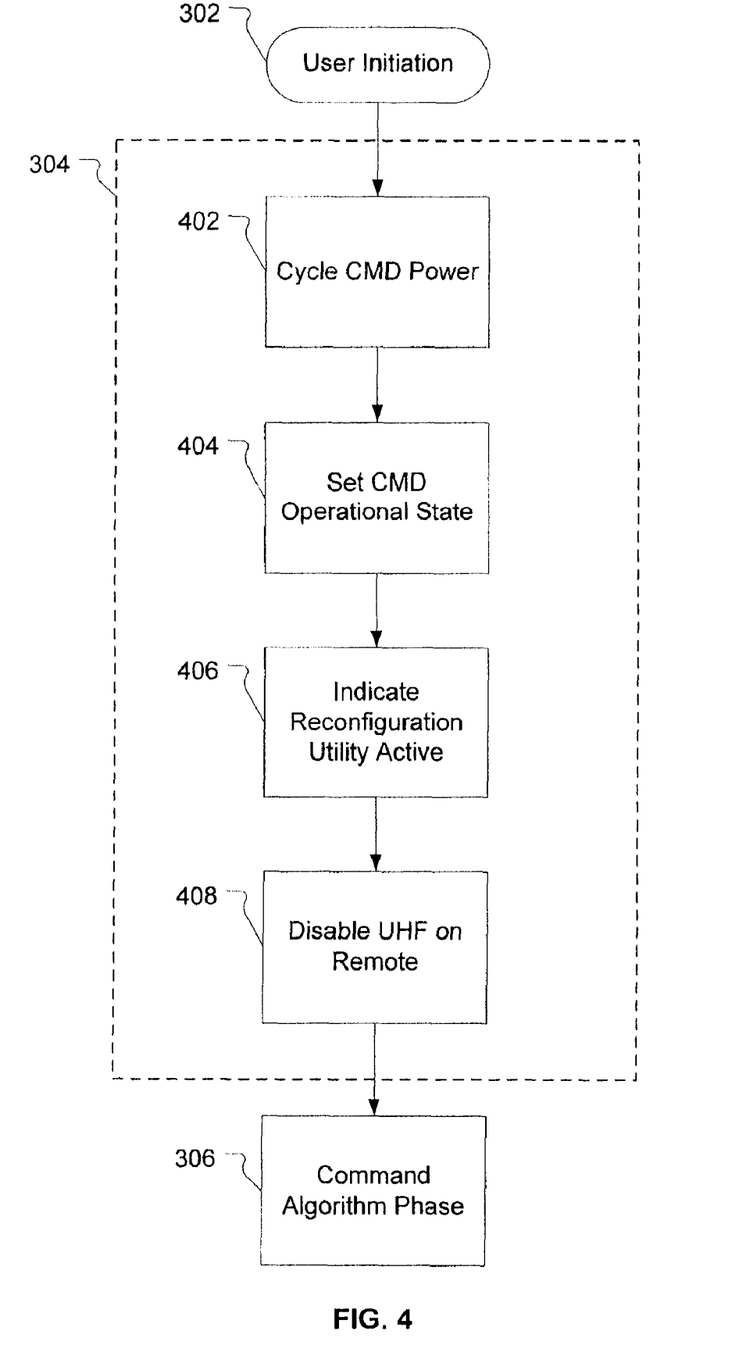
FIG. 4 is a flow chart showing one embodiment of the logical substeps performed during the Setup Phase shown in FIG. 3.

Returning now to the Setup Phase 304, FIG. 4 is an operational flow diagram of an embodiment of the detailed logical steps performed during the Setup Phase 304 that follows the initiation operation 302 and that is described generally with respect to FIG. 3. Whereas FIG. 3 is a generalized operational flow applicable to most embodiments of the ARD 200, FIG. 4 is specifically directed to the embodiment shown in FIG. 2a wherein the CMD 100 comprises an ARD 200.

In the embodiment shown in FIG. 4, the Setup Phase 304 follows the initiation operation 302 and begins with a power cycling operation 402, wherein the power of the CMD 100 is turned off and then turned back on. After the power cycling operation 402, a set operation 404 sets the CMD 100 to an operational state that may include, but is not limited to, displaying a specific screen or information or tuning the CMD 100 to a specific channel. Examples of displaying a specific screen can be found in an EchoStar Technology Corporation, Model No. 501 or 721 set-top-box. Those products are set to display a "System Information" screen generated from data stored in the set-top-boxes and which does not correspond to a specific channel provided by a content distributor. This operational state may be used for several reasons: a) when in this operational state the CMD 100 may only recognize limited user inputs; and b) the "System Information" screen is a basic operational state and not subject to being relocated to a different channel number by the content distributor, and thus always at a known location. In another embodiment, the predetermined operational state may be a dedicated system information channel provided by the content distributor.

Once the operational state is set by the set operation 404, an indication operation 406 indicates to the user that the reconfiguration method is being performed. The indication may be audible, such as a beep, tone or 'chirp' emitted by the CMD 100, or visual, such as comprising flashing lights on the CMD 100 or the remote control 126. An example of indication includes visual indicators such as simultaneously flashing all lights (for example, SAT, TV, VCR and AUX) on the CMD 100 three times.

In embodiments wherein the entertainment system 102 comprises a remote controller 142, the indication operation 406 is followed by a disable operation 408 that turns off the UHF transmitter on the remote controller 142. Because UHF transmissions can potentially penetrate walls and possibly be received by nearby CMDs 100 (such as one in an adjoining apartment), disable operation 408 is included to prevent UHF commands to reconfigure the entertainment system 102 sent from the remote controller to inadvertently affect the configuration of a nearby CMD 100. Upon completion of the disable operation 408 the Setup Phase 304 is complete and the Command Algorithm Phase 306 begins.

Figure 5:
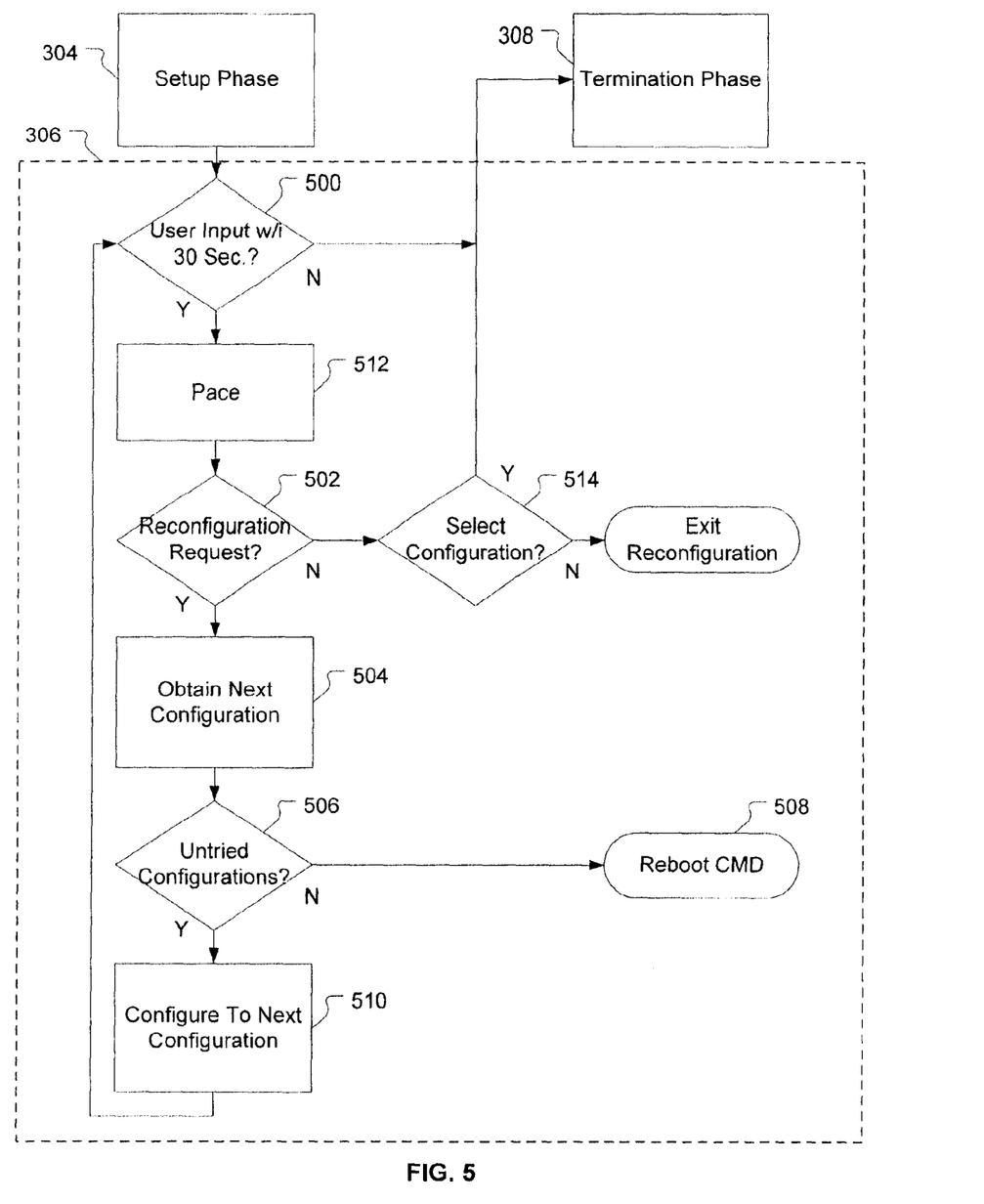
FIG. 5 is a flow chart showing one embodiment of the logical substeps performed during the Command Algorithm Phase shown in FIG. 3.

FIG. 5 is an operational flow diagram of an embodiment of the detailed logical steps performed during the Command Algorithm Phase 306 that follows the Setup Phase 304 and that is described generally with respect to FIG. 3. Whereas FIG. 3 is a generalized operational flow applicable most embodiments of the ARD 200, FIG. 5 is specifically directed to the embodiment shown in FIG. 2a wherein the CMD 100 comprises an ARD 200.

In the embodiment shown in FIG. 5, the Command Algorithm Phase 306 follows the Setup Phase 304 and begins with a command determination operation 500 that monitors the ARD 200 for user commands. If no command from the user is received within a predetermined amount of time, the determination operation 500 ends the Command Algorithm Phase 306 and the Termination Phase 308 begins. In the preferred embodiment shown in FIG. 5 the predetermined amount of time is 30 seconds.

If the command determination operation 500 determines that a command has been input, a pace operation 512 paces the command, by causing the ARD 200 not to accept another command for a predetermined delay period. The pace operation 512 prevents a user from inadvertently sending commands too quickly and possibly going past an operable configuration. In a preferred embodiment, the predetermined pace delay is about one second.

After the pace operation 512 a second determination operation 502 determines if the command is a reconfiguration request, i.e., a command by the user to change the configuration of the entertainment system 102 by changing an operational state of a connected component. Commands may be given by the user depressing a button on the CMD 100 or a button on a remote control 126 connected to the CMD 100, or by the user selecting a reconfiguration command from an on-screen user control menu.

In a preferred embodiment of the present invention, the ARD 200 supports three different user inputs. The user may make a reconfiguration request by pressing a "Reset" button after initiation of the reconfiguration utility. The user may also make a configuration selection by pressing an "OK" button. If the user presses any other button, then the ARD 200 interprets this as an exit command that immediately initiates the Termination Phase 308 regardless of whether the utility is in the Setup Phase 302 or Command Algorithm Phase 304.

If the second determination operation 502 determines that the command is a reconfiguration request, obtain operation 504 obtains the next configuration for the entertainment system 102. In a preferred embodiment, this is achieved by consulting a predetermined lookup table containing all the possible configurations of the entertainment system 102. One skilled in the art will recognize that other method of obtaining the next configuration are possible and within the scope of this invention. The configuration obtained is the one that corresponds to the number of reconfiguration requests determined by the second determination operation 502 since the initiation of the ARD 200. Thus, in the preferred embodiment, the third reconfiguration request will obtain the third configuration in the predetermined lookup table.

An example of a predetermined lookup table developed for an entertainment system 102 comprising a CMD 100, an ARD 200 and TV 120 is presented in Table 1. An example of predetermined lookup table developed for an entertainment system 102 comprising a CMD 100, an ARD 200, a VCR 136 and TV 120 is presented in Table 2. These tables may be considered different algorithms to be used for determining the operable configuration of different entertainment systems based on the number, type and connection of the components that make up the entertainment system. Additional embodiments of lookup tables are possible depending on what components may be supported by the ARD 200. The ARD 200 selects the appropriate lookup table based on the components the ARD 200 is currently programmed to control. This may be achieved by querying the control codes stored for each component that the ARD 200 can support. In this embodiment, the ARD 200 is shipped with a default, dummy code, such as "222," stored as the control code for each component that indicates to the ARD 200 that it has not yet been programmed to control this component. Such a dummy code, of course, should not correspond to any known component's control code. For example, the ARD 200 may be able to support a TV 120, a CMD 100 and VCR 136, but if the ARD 200 has not been programmed to control the VCR 136, as indicated by the default code stored for the VCR 136 component, Table 1 would be used.

TABLE 1

1. TV - Chan 03
2. TV - Chan 04
3. TV - Video Input 1
4. TV - Video Input 2
5. TV - Video Input 3
6. TV - Video Input 4
7. TV - Video Input 5
8. All Configurations Obtained

TABLE 2

1. TV - Chan 03
2. VCR - Chan 03
3. VCR - Chan 04
4. VCR - Input (Video 1)
5. VCR - Input (Video 2)
6. TV - Chan 04
7. VCR - Chan 03
8. VCR - Chan 04
9. VCR - Input (Video 1)
10. VCR - Input (Video 2)
11. TV - Video Input 1
12. VCR - Chan 03
13. VCR - Chan 04

TABLE 2-continued

14. VCR - Input (Video 1)
15. VCR - Input (Video 2)
16. TV - Video Input 2
17. VCR - Chan 03
18. VCR - Chan 04
19. VCR - Input (Video 1)
20. VCR - Input (Video 2)
21. TV - Video Input 3
22. VCR - Chan 03
23. VCR - Chan 04
24. VCR - Input (Video 1)
25. VCR - Input (Video 2)
26. VCR - Power toggle
27. TV - Chan 03
28. TV - Chan 04
29. TV - Video Input 1
30. TV - Video Input 2
31. TV - Video Input 3
32. All Configurations Obtained Note that for most components, the "Video Input" command is a toggle command that causes the component to change to the next video input in a sequence rather than a corm and to go to "Video Input 3." Thus, for example, entries 29, 30 and 31 in Table 2 are actually the same entry, a "TV-Video Input" toggle command.

After the next configuration has been obtained, a third determination operation 506 determines if all configurations have been obtained. In one embodiment, the last entry of a lookup table is an indicator that all configurations have been obtained and the third determination operation 506 determines if that entry was obtained in the obtain operation 504. If the third determination operation 506 determines that all configurations have been obtained, then the CMD 100 is rebooted by the reboot operation 508.

Reboot operation 508 causes the CMD 100 to reinitialize its operating system, for example in the same way a personal computer may be rebooted by restarting the computer. Reboot operation 508 may include shutting down the operating system and restarting by reloading operating system software from the memory of the CMD 100.

If, however, the third determination operation 506 determines that a valid configuration has been obtained by the obtain operation 504, then a configure operation 510 configures the entertainment system 102 to the configuration obtained by the obtain operation 506.

Once the entertainment system 102 has been configured by configure operation 510, then the command determination operation 500 takes over. In a preferred embodiment, the time it takes for the ARD 200 to reconfigure the entertainment system 102 after a user input is determined by command determination operation 500 (the time from the command determination operation 500 to the configure operation 510) is less than the pace delay period.

Returning now to the second determination operation 502 that determines whether the command is a reconfiguration request, if the user input determined in the command determination operation 500 is not a reconfiguration request, then a selection determination operation 514 determines if the user input is a selection by the user of the current configuration. If the user input is a selection of the configuration, then the selection determination operation 514 ends the Command Algorithm Phase 306 by initiating Termination Phase 308. In a preferred embodiment, the user makes a selection by pressing an 'OK' button on the remote controller 142. If the selection determination operation 514 determines that the user input was not a selection, then the user input must be an exit command made by the user (in preferred embodiments made pressing a button other than the 'Reset' and 'OK' buttons). In that case, the selection determination operation 514 exits the reconfiguration method 300, leaving the components in whatever operational state they were in when the non-selection user input was made.

Figure 6:
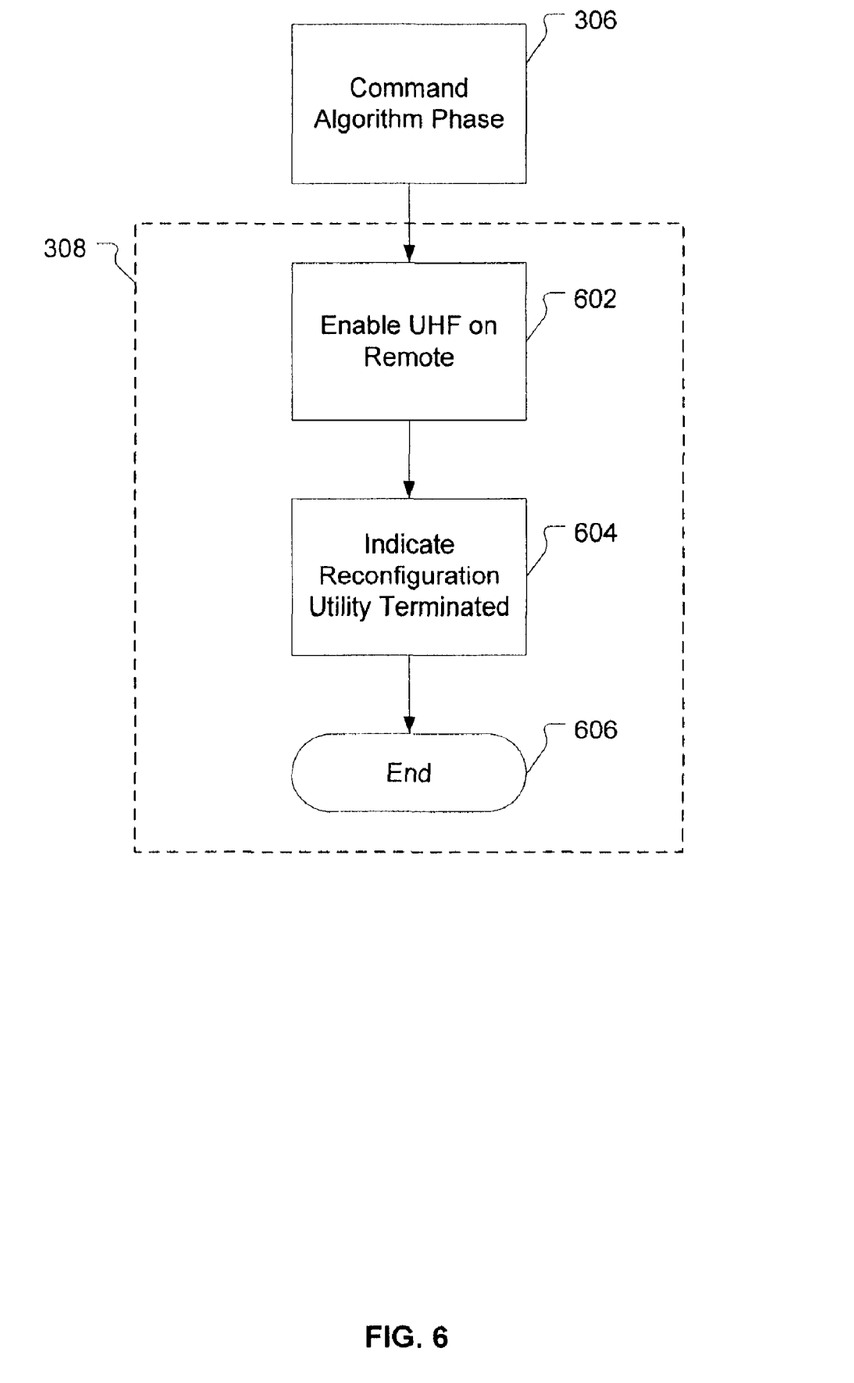
FIG. 6 is a flow chart showing one embodiment of the logical substeps performed during the Termination Phase shown in FIG. 3.

FIG. 6 is an operational flow diagram of an embodiment of the detailed logical steps performed during the Termination Phase 308 that follows the Command Algorithm Phase 306 and that is described generally with respect to FIG. 3. The purpose of the Termination Phase 308 is to terminate the operation of the ARD 200 and return the entertainment system 102 to normal operation. After the Command Algorithm Phase 306 has configured the entertainment system 102 and an operable configuration has been selected, the Termination Phase 308 re-enables the UHF transmitter on the remote control 126 with enable operation 602. An indication operation 604 then indicates that the reconfiguration is complete and signaling the end 606 of the reconfiguration. In one preferred embodiment, indication operation 604 uses a visible indicator.

Figure 7:
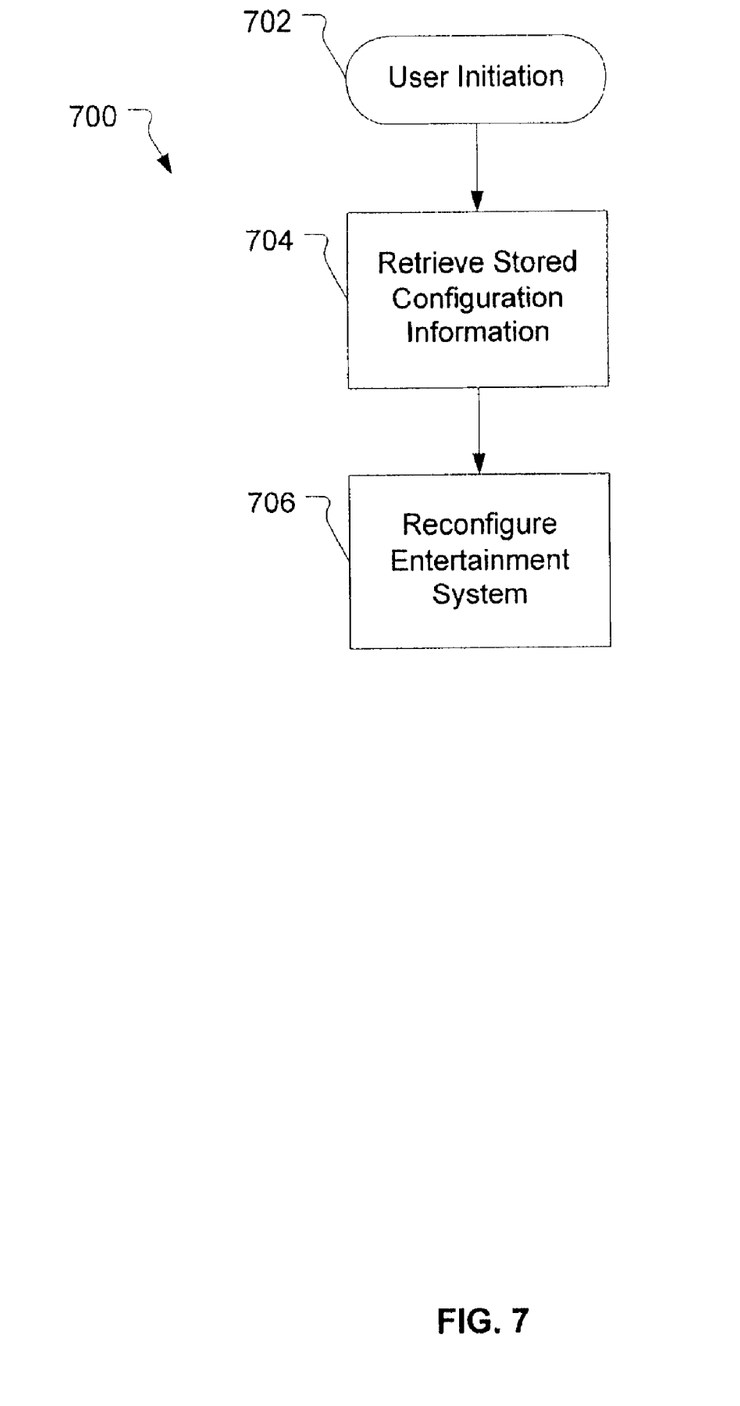
FIG. 7 is a flow chart showing another embodiment of the logical substeps performed by an automatic reconfiguration device.

FIG. 7 shows yet another embodiment of a reconfiguration method 700 that may be performed by an ARD 200. In the embodiment, upon installation of the entertainment system 102 containing the ARD 200, information relating to an operable configuration of the entertainment system 102 is input by the installer and stored by the ARD 200. Upon receiving a user command to reconfigure the entertainment system 102, shown by initiation operation 702, the stored configuration information is retrieved by retrieve operation 704. ARD 200 then utilizes the stored information to change one or more operational states of the components and reconfigure the entertainment system in reconfigure operation 706.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the reconfiguration utility may store a specific configuration related to some or all of the components in the entertainment system. Upon receipt of the reconfiguration request, the ARD 200 then reconfigures all the components to their stored configuration. In this embodiment, the user may preprogram the ARD 200 that the entertainment system is operable when a component, such as the TV 120, is set to a specific input, such as channel 3. In this case, the ARD 200 will not attempt to change the channel of the TV to any channel other than 3 during reconfiguration. In addition, the ARD 200 may issue commands the other components to deliver programming on channel 3, based the TV configuration information. If this does not return the entertainment system to an operable configuration, then the ARD 200 may revert to using a lookup table as described above. Numerous other changes may be made which will readily suggest themselves to those skilled in the art and which are encompassed in the spirit of the invention disclosed and as defined in the appended claims.

What is claimed is:

1. A method comprising:
    selecting at least one of two or more possible configurations for at least one component of an entertainment system having two or more components utilizing at least one automatic reconfiguration device, wherein at least one of the two or more possible configurations is a non-operable configuration; and
    receiving an indication, at the at least one automatic reconfiguration device from at least one user, that a current configuration of the two or more possible configurations is an operable configuration;
    wherein each of the two or more possible configurations is defined by at least one or more characteristics of a communications element interconnecting the two or more components of the entertainment system and a characteristic of a desired type of content to be presented by the entertainment system.

2. The method of claim 1, further comprising:
    displaying visual information to a user by way of the entertainment system so that the user may determine if the current configuration is an optimal configuration.

3. The method of claim 1, wherein the selecting operation comprises:
    manually changing at least one operational state of at least one of the components of the entertainment system to a different operational state based on a given identification of available operational states.

4. The method of claim 1, wherein the selecting operation comprises:
    automatically changing the operational states of one or more components based on stored information indicative of the operational states of the components when the entertainment system is in the operable configuration.

5. The method of claim 4, further comprising:
    storing information indentifying a current configuration of the system as an optimal configuration.

6. The method of claim 5, further comprising:
    changing the current configuration to another of the at least two possible configurations in response to a change in at least one of the one or more characteristics of a communications element interconnecting the two or more components.

7. The method of claim 6, further comprising:
    waiting a predetermined period of time after changing the current configuration to another of the at least two possible configurations before accepting any additional command to change the current configuration, or to indicate that the current configuration is the optimal configuration.

8. The method of claim 1, wherein at least one of the components comprises a multipurpose component for a local area network.

9. The method of claim 1, wherein the content is communicated between at least two of the components via an internet connection.

10. The method of claim 1, wherein the selecting step further comprises:
    receiving a user input indicating at least one selection of the two or more possible configurations from a remote control device.

11. An electronic device, comprising:
    a communication engine configured to receive content from a content management device external to the electronic device, and to transmit the content to an external output device; and
    an automatic reconfiguration device configured to select an operable configuration from a plurality of configurations of a system comprising the electronic device, the content management device, and the external output device;
    wherein the automatic reconfiguration device selects the operable configuration by selecting a configuration of the plurality of configurations and receiving an indication from at least one user that the configuration is operable and wherein each of the configurations is defined by at least one operational characteristic of at least one of the electronic device, the content management device, and the external output device.

12. The electronic device of claim 11, wherein:
the automatic reconfiguration device is configured to transfer commands to at least one of the content management device and the external output device via the communication engine to alter at least one operational characteristic of at least one of the content management device and the external output device.

13. The electronic device of claim 11, wherein:
the communication engine is configured to receive a user instruction from the external output device to initiate a reconfiguration operation to select the operable configuration.

14. The electronic device of claim 13, wherein:
the communication engine is configured to receive a second user instruction from the at least one external output device to select the operable configuration.

15. The electronic device of claim 11, wherein:
The automatic reconfiguration device is configured to monitor the content received from the content management device, and to select the operable configuration based on the monitoring and the indication from the at least one user.

16. The electronic device of claim 15, wherein:
the automatic reconfiguration device is configured to receive information from the external output device indicating a status of the content as received at the external output device, and to select the operable configuration based on the information and the indication from the at least one user.

17. An electronic device, comprising:
a content management engine configured to deliver content to an external output device;
a communication engine configured to transmit commands to the external output device to alter at least one operational characteristic of the external output device; and
an automatic reconfiguration device configured to select an operable configuration from a plurality of possible configurations of an entertainment system comprising the electronic device and the external output device;
wherein the automatic reconfiguration device selects the operable configuration by selecting a configuration of the plurality of possible configurations and receiving an indication from at least one user that the configuration is operable and wherein each of the possible configurations is defined by at least one operational characteristic of at least one of the electronic device and the external output device.

18. The electronic device of claim 17, wherein:
the automatic configuration device is configured to select the operable configuration in response to data indicating that a current configuration of the entertainment system is inoperable.

19. The electronic device of claim 17, wherein:
the automatic reconfiguration device is configured to select the operable configuration periodically.

20. The electronic device of claim 17, wherein:
the at least one operational characteristic comprises a characteristic of a communications element coupling the electronic device with the external output device.

21. The electronic device of claim 17, wherein:
the at least one operational characteristic comprises a characteristic of the content.

22. The electronic device of claim 17, wherein:
the content management engine is configured to receive an instruction from a provider of the content to initiate the selection of the operable configuration.

23. The electronic device of claim 17, wherein:
the communication engine is configured to receive a user instruction via the external output device to initiate the selection of the operable configuration.

24. The electronic device of claim 17, further comprising:
a user interface configured to receive a user instruction to initiate the selection of the operable configuration.

25. A method, comprising:
receiving information, utilizing at least one automatic reconfiguration device, indicating a change in a characteristic of a network coupled to at least one of a plurality of components of an entertainment system, wherein the configuration of the entertainment system is defined by operational states of each of the components;
in response to receiving the information, initiating a reconfiguration operation, utilizing the at least one automatic reconfiguration device, to yield an operable configuration of the entertainment system, wherein the reconfiguration operation comprises modifying at least one operational state of at least one of the components; and
performing the reconfiguration operation utilizing the at least one automatic reconfiguration device, wherein the reconfiguration operation comprises at least one iteration, wherein each iteration comprises modifying at least one operational state of the at least one of the components and determining whether the configuration of the entertainment system resulting from the modification is operable based on at least one indication received from at least one user.

26. The method of claim 25, wherein:
the network is configured to communicatively couple at least two of the components together.

27. The method of claim 25, wherein:
the network comprises a wireless network.

28. A peripheral electronic device, comprising:
a user interface configured to receive a user instruction to initiate a reconfiguration operation of an entertainment system to be performed by an automatic reconfiguration device external to the peripheral electronic device, wherein the entertainment system comprises a plurality of components, wherein each of the components comprises at least one operational state, and wherein the configuration of the entertainment system is defined by the at least one operational state of each of the components;
control circuitry configured to generate a command to initiate the reconfiguration operation in response to the user instruction; and
a communication interface configured to transfer the command of the automatic reconfiguration device;
wherein:
the user interface is configured to receive a second user instruction indicating the entertainment system is currently in an operable configuration;
the control circuitry is configured to generate a second command to designate the operable configuration in response to the second user instruction; and
the communication interface is configured to transfer the second command to the automatic configuration device to end performance of the reconfiguration operation.

29. The peripheral electronic device of claim 28, wherein:
the communication interface is configured to receive content from at least one component of the entertainment system; and
the user interface is configured to present the content received via the communication interface to a user.

30. The peripheral electronic device of claim 28, wherein:
the user interface is configured to generate second user instructions to control presentation of content provided via at least one of the components to a user;
the control circuitry is configured to generate second commands in response to the user instructions; and
the communication interface is configured to transmit the second commands to the at least one of the components.

31. The peripheral electronic device of claim 28, wherein:
the communication interface comprises a wireless communication interface configured to transfer the command to the automatic reconfiguration device wirelessly.

32. A method, comprising:
receiving a request originated by a user, utilizing at least one automatic reconfiguration device, to alter a configuration of an entertainment system comprising at least one component, wherein the entertainment system is configured to deliver a plurality of content types to a user, and wherein the configuration of the entertainment system is determined by at least one operational state of the at least one component; and
in response to receiving the request, initiating a reconfiguration operation, utilizing the at least one automatic reconfiguration device, to yield an operable configuration of the entertainment system, wherein the reconfiguration operation comprises modifying at least one operational state of the at least one component and receiving an indication from the user indicating that the configuration of the entertainment system is operable after the modification, and wherein the reconfiguration operation alters the type of content being provided to the user.

33. The method of claim 32, wherein:
the content types comprise at least one of television programs, motion pictures, musical selections, streaming video content, streaming audio content, interactive audio content, interactive video content, and textual documents.

34. The method of claim 32, wherein:
modifying the at least one operational state of the at least one component comprises altering processing of content within the at least one component.

* * * * *